April 15, 1958  D. D. PETTIGREW ET AL  2,830,628
MULTI-SPEED DRIVE FOR BAND SAWS AND THE LIKE
Filed Feb. 28, 1955                                    2 Sheets-Sheet 1
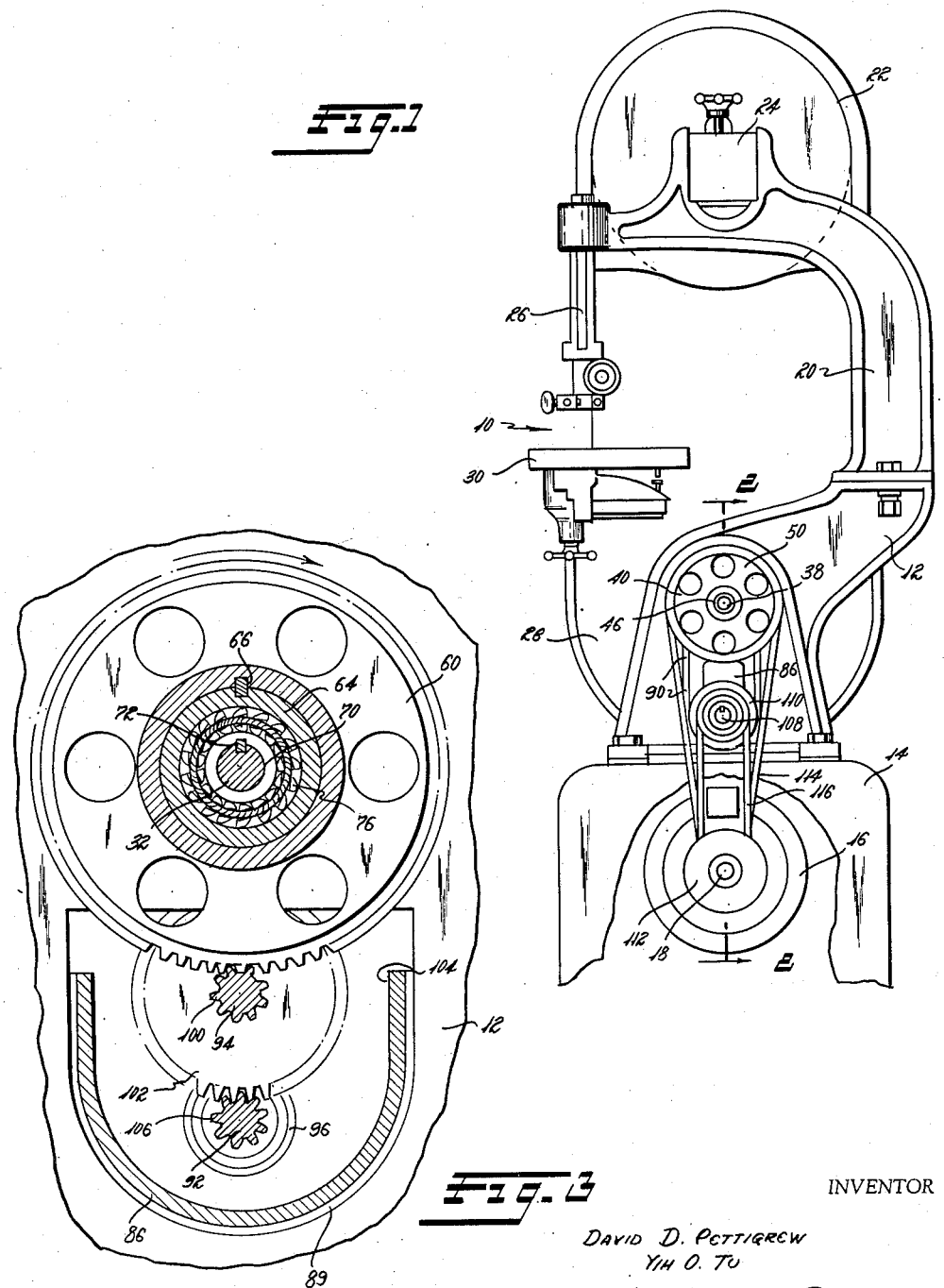
INVENTOR
DAVID D. PETTIGREW
YIH O. TU
BY
ATTORNEYS

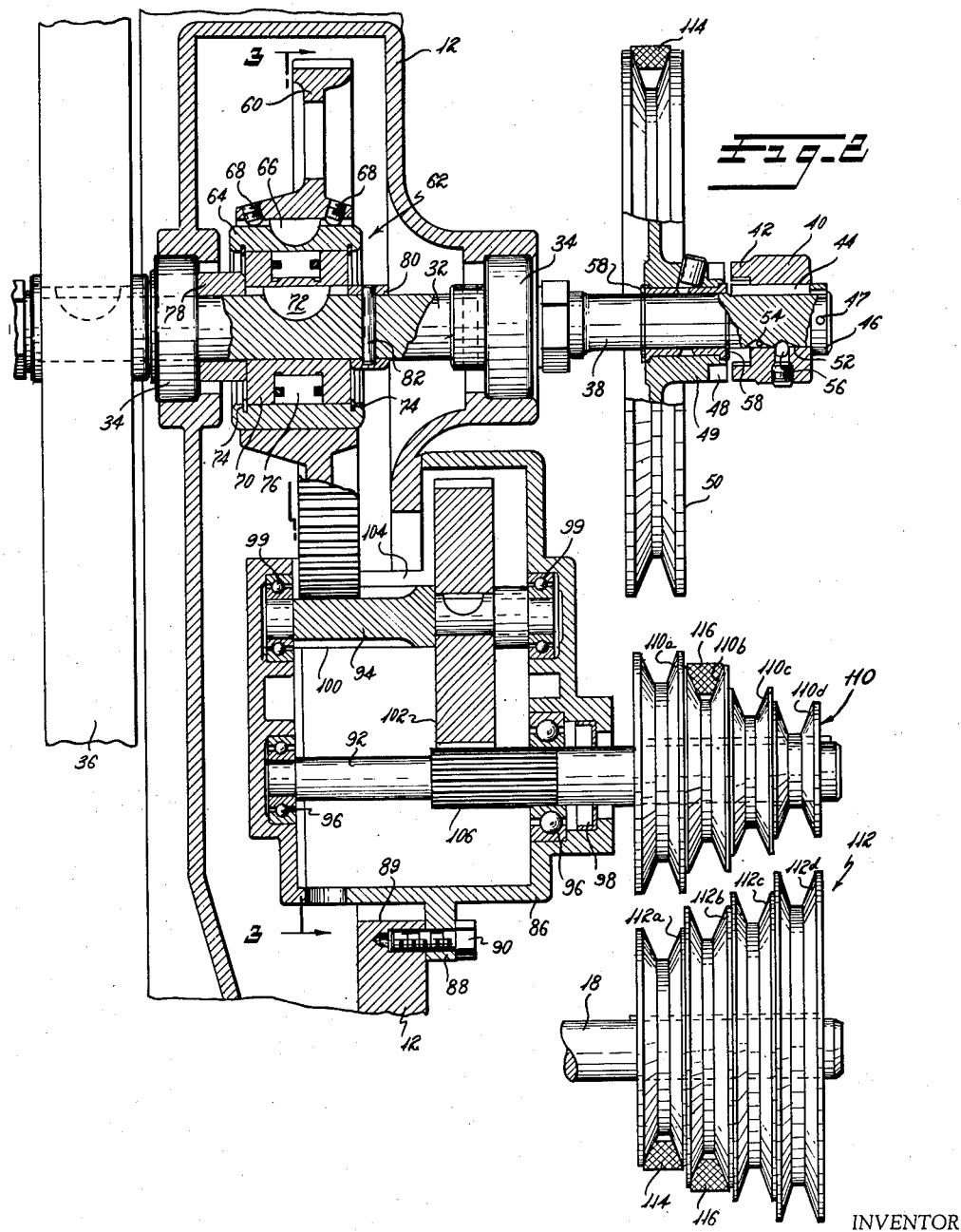

United States Patent Office 2,830,628
Patented Apr. 15, 1958

2,830,628

MULTI-SPEED DRIVE FOR BAND SAWS AND THE LIKE

David D. Pettigrew and Yih O. Tu, Pittsburgh, Pa., assignors to Rockwell Manufacturing Company, Pittsburgh, Pa., a corporation of Pennsylvania Application February 28, 1955, Serial No. 490,786

8 Claims. (Cl. 143—17)

The present invention relates to a multi-speed drive and is particularly but not exclusively adapted to be used as a drive for a multi-speed band saw.

This invention contemplates a multi-speed drive mechanism having means for instantaneously changing one speed to another without the necessity of shifting belts or gears or changing pulleys. The drive mechanism is particularly adapted to use on band saws used alternatively for metal-cutting or wood-cutting and provides an improved band saw having a plurality of relatively low speed metal-cutting drive paths and one high-speed wood-cutting speed.

It is known in prior art to use a single band saw for both metal-cutting and wood-cutting. One particular adaptation utilizes a multiple sheave motor pulley together with a change gear speed mechanism coupled to the band saw driving wheel. Various pulley arrangements are provided between the motor pulley and a multiple sheave pulley on the gear transmission or a single pulley on the driving wheel shaft. In changing the drive from a wood-cutting speed to a metal-cutting speed, it is necessary to remove and replace the driving belt, only one driving belt being installed in the drive train transmission at any particular time.

Accordingly, a primary object of the present invention resides in provision of a novel multi-speed drive.

Another object resides in the provision of a novel multi-speed drive for a band saw machine.

Still another object resides in providing a novel multi-speed transmission where high and low speeds may be controlled through the coordination of separate clutch devices at least one of which is an overrunning or one way clutch.

A still further object is to provide a simplified change speed mechanism wherein high and low speeds may be obtained by manipulation of a single element.

Another object of this invention resides in the provision of an improved multi-speed band saw for alternately cutting metal and wood.

Further novel features and objects of this invention will become apparent from the following detailed description and the appended claims when read in conjunction with the accompanying drawings in which:

Figure 1 illustrates an elevational view of a band saw utilizing the multi-speed drive of this invention;

Figure 2 is an enlarged sectional view taken on line 2—2 of Figure 1 showing the specific details of the multi-speed drive;

Figure 3 (sheet 1) is a reduced sectional view taken on line 3—3 of Figure 2 showing details of the drive gearing.

The drawings are to be understood as disclosing a typical or preferred form of the invention and in these drawings like reference characters identify the same parts in the different views.

With reference to Figure 1, a band saw 10 is illustrated having a base casting 12 mounted on a conventional stand 14. Within the stand 14 is a drive motor 16 arranged with its drive shaft 18 extending through a side of stand 14 and parallel with the axes of the band saw wheels. The upper portion of the illustrated band saw is conventional and will not be described in detail herein. In general, it comprises an upper support casting 20 bolted to the base casting 12 and providing a rigid support for an upper wheel housing 22, the adjustable upper wheel journal 24, and the adjustable blade guide and support 26. The lower band saw wheel housing 28 is rigidly fastened to the base casting 12, which also provides support for the band saw table 30 adjustably fastened thereto.

The primary support structure for the driven elements of the drive mechanism is the base casting 12 which, as seen in Figure 2, journals the output shaft 32 in this preferred embodiment of the invention, the lower band saw wheel shaft. Shaft 32 is journalled for rotation in the walls of base casting 12 by means of two axially spaced bearings 34. The lower band saw wheel 36 is fixedly mounted on one end of shaft 32 for rotation therewith. A short extension 38 is fixed to and extends coaxially from the other end of shaft 32. A clutch member 40 is non-rotatably carried on the end of extension 38 by means of a key 44 and is provided with axially extending clutch lugs 42. Clutch member 40 rotates with but may be axially shifted on the extension shaft 38. Movement of clutch member 40 toward the end of the extension shaft 38 is limited by a stop such as collar 46 fastened to the end of extension 38 by set screw 37 or by a snap ring (not shown) located in a groove milled in the extreme right end of extension shaft 38. Clutch member 40 may be axially shifted to move lugs 42 into and out of engagement with matching clutch lugs 48 provided on the hub 49 of pulley wheel 50 journalled on extension shaft 38 adjacent clutch member 40. Two axially spaced detent notches, 52 and 54, are provided in shaft 38 adjacent its end and within the axial confines of clutch member 40. These notches together with a radially disposed ball and spring 56 retained in clutch member 40 provide a means for maintaining clutch member 40 in either of two axial positions determining the engaged and disengaged position of member 40.

The pulley 50, while journalled for relative rotation on shaft extension 38 as previously suggested is fixed against axial movement in close proximity to clutch member 40 by means of snap rings 58 coacting with annular grooves in shaft extension 38 in well known manner. It is apparent that an axial movement of clutch member 40 toward pulley 50 will engage the clutch lugs 42 of member 40 with the clutch lugs 48 on pulley 50 thereby positively clutching pulley 50 to shaft extension 38 for rotation therewith. This declutchable pulley wheel 50 is drivingly connected to the motor pulley wheel as hereinafter described to serve, when desired, as the high speed drive for cutting wood or like material.

A second drive for shaft 32 is provided by a gear 60 and one-way overrunning clutch 62 generally known as a sprag clutch coaxially mounted on shaft 32 between the bearings 34. Gear 60 is secured to rotate with the outer race 64 of one-way clutch 62 by a key 66 and is axially fixed on the race by axially spaced set screws 68 threaded through the hub of gear 60. The inner race 70 of one-way clutch 62 is secured to rotate with shaft 32 by means of key 72. Spring retaining rings 74 maintain race 70 against relative axial movement with respect to race 64. Although the disclosed embodiment illustrates a sprag clutch employing sprags 76 as the clutching elements, it is to be understood that any conventional one-way clutching mechanism, such as springs pressed balls, pawls or rollers, may be used. Since the sprag clutch is well known and per se forms no part of the present invention, reference may be made to United States Letters Patent No. 2,407,772 for a more detailed disclosure thereof.

The inner race 70 of one-way clutch 62, and hence the entire clutch unit with attached gear 60, is maintained in axial position on shaft 32 by means of collars 78 and 80. Collar 78 abuts one of the bearings 40 while collar 80 maintains the inner clutch race 70 abutted against collar 78 and is in turn fastened to shaft 32 by means of a pin 82. As will be presently described, gear 60 is rotated at a much slower rate than pulley 50. Thus whenever clutch element 40 is shifted to engage pulley 50 with the shaft extension 38, shaft 32 will be rotated at a rate of speed much higher than that of gear 60 and shaft 32 and inner race 70 of the sprag clutch will overrun the outer race and gear 60. However, if clutch 40 is disengaged gear 60 and outer race 64 will tend to rotate with respect to shaft 32 in the proper direction to pick up shaft 32 and cause the desired directional movement of saw driving wheel 36 but at a lower metal cutting rate of speed.

The transmission gear box 86 having an integral mounting flange 88 projects through an opening 89 in a side wall of base casting 12 below the shaft 32 and, through gears, shafts and pulleys to be described, provides the low speed drive for gear 60. Gear box flange 88 is fastened to the casing by screws 90. Two shafts 92 and 94 carried by gear box 86 are positioned below and parallel to the lower band saw wheel shaft 32 and are shown vertically spaced from one another. Lower shaft 92 is journalled in opposite side walls of the gear box 86 by bearings 96 and one end projects through an oil seal 98, maintained in a side wall recess adjacent one of the bearings, to the exterior of the gear box. The upper shaft 94 is journalled in the opposed side walls of gear box 86 by bearings 99. Upper shaft 94 has a gear 100 formed thereon and a gear 102 keyed thereto for rotation therewith. The portion of gear box 86 that projects through base casting opening 89 has an opening 104 in its upper wall permitting driven gear 60 to mesh with gear 100 on the shaft 94 when the gear box is fastened to the base casting 12. A gear 106 keyed to or integrally formed on shaft 92 meshes with gear 102 on shaft 94. The end 108 of shaft 92 which extends to the exterior of gear box 86 has keyed thereto a cone pulley 110 with multiple sheaves. The arrangement of the gears within gear box 86 provides a speed reduction between the cone pulley 110 and driven gear 60 carried by the sprag clutch 62.

As illustrated in Figure 2, the motor shaft 18 parallels shafts 92, 94 and 32 and is positioned vertically below those shafts. It is to be understood that the motor and hence shaft 18 may be off-set on either side of a vertical plane containing the other shafts. A driving cone pulley 112 with multiple sheaves is keyed to the end of motor shaft 18 with the various sheaves aligned with the multiple sheaves on pulley 110. In the disclosed embodiment, the left sheaves of pulleys 110, 112 and the large driven pulley 50 are all in vertical driving alignment. The individual sheaves of cone pulley 110 are designated in order of decreasing diameter from left to right by reference characters 110a, 110b, 110c and 110d. The individual sheaves of the motor pulley 112 are designated in order of increasing diameter from left to right by reference characters 112a, 112b, 112c, and 112d. In the arrangement shown, a belt 114 extends between motor pulley sheave 112a and the drive pulley 50 to establish a high rate wood-cutting speed while a second belt 116 extends between motor pulley sheave 112b and cone pulley sheave 110b, to establish a second lower rate of speed.

Operation

It will be noted that the pulley cone 112 on motor shaft 18 is larger than the pulley cone 110 mounted on the gear box shaft 92. It is to be understood, however, that the two pulleys 110 and 112 may be interchanged. In either case the sheave 110a will be opposite sheave 112a and sheave 110b will be opposite sheave 112b, etc.

Note that sheaves 110a and 112a are the same diameter hence a direct drive from one to the other would result in a speed ratio of 1:1. Normally, the two belts 114 and 116 are simultaneously in use, as illustrated, and the 1:1 ratio, or the left hand sheaves of cone pulleys 110 and 112 whatever their speed ratio may be, are not interconnected by a belt.

When it is desired to drive the band saw wheel 36 at a slow metal-cutting speed, the clutch element 40 will be disengaged from the hub of pulley wheel 50 as illustrated in Figure 2. Belt 116 will then establish a drive from motor pulley sheave 112b to sheave 110b, driving the shaft 92 and gear 106. Gear 106 drives through gears 102 and 94 to driven gear 60 which is rotated in a direction causing sprags 76 to become effective to establish a positive drive connection between gear 60 and shaft 32. Shaft 32 and the lower band saw wheel and hence the band saw blade are thereby driven at a low metal-working speed, established by the ratio of diameters of sheaves 112b and 110b together with the speed reduction of the gears in gear box 86. Since clutch element 40 is disengaged, the pulley 50, even though driven through belt 114 by the motor pulley 112, will rotate freely relative to the shaft extension 38.

With the belt 114 in place, three metal-working speeds are available in the arrangement illustrated by simply selecting the desired drive combination between pulley sheaves 112b, 112c, 112d and 110b, 110c and 110d. For example, with the belt 114 in place as illustrated, a certain speed will be obtained when the belt 116 extends between sheaves 112b and 110b; a greater speed will be obtained when the belt 116 is moved to extend between sheaves 112c and 110c; and a still greater speed is obtained when the belt 116 is moved to a position extending between the sheaves 112d and 110d. By interchanging the cone pulleys 110 and 112, three more speeds are made available since the belt 114 will then extend between the sheave 110a of cone pulley 110 and the pulley 50. By removing the belt 114, another speed ratio is obtained for metal working since the belt 116 may then be moved to extend between sheaves 110a and 112a. It is, therefore, seen that seven different metal-working speeds are available—six when the belt 114 is in place extending between pulley 50 and either of sheaves 112a or 110a, the seventh being made available when the belt 114 is removed. To avoid the necessity of removing the belt 114 to obtain the seventh speed, an additional sheave equal to the diameter of sheaves 110a and 112a may be incorporated in each of the cone pulleys 110 and 112, thus enabling a one to one drive ratio between motor shaft 18 and shaft 92 even though belt 114 is in place between the motor pulley and driven pulley 50.

When it is desired to drive the band saw wheel 36 at a fast wood-working speed, the clutch element 40 is moved to the left to engage clutch lugs 42 and 48 and the pulley 50 is thereby clutched to shaft extension 38. The clutch element 40 will be maintained in this clutching position by engagement of the spring loaded ball 56 with the left hand detent notch 54. The band saw drive will now be from either of sheaves 110a or 112a, depending on which pulley is mounted on motor shaft 18, to the pulley 50. Pulley 50, through clutch member 40, will drive the shaft extension 38 and shaft 32 at a speed much greater than that at which gear 60 is caused to rotate by a combination of the drive means between cone pulleys 110 and 112. The sprag clutch 62 allows the lower band saw wheel shaft 32 to rotate at this higher speed even though gear 60 is being driven through the drive train made up of pulleys 110 and 112, gears 106, 102, 94 and 60. It is thus seen that there is no need to disengage belt 116 when the wood-working speed is being used, nor is it necessary to disengage the belt 114 when the metal-working speeds are being used as the clutch 40 is merely manually shifted into or out of engagement with the hub of pulley 50 to change from one speed to the other. Since the sheaves 110a and 112a are of equal diameter, the pulley 50 will be driven at the same wood-working speed, regardless of which cone pulley is mounted on the motor shaft 18. The only time it is necessary to disengage the belt 114 is when the metal-working speed resulting from the combination of sheaves 112 and 110a is desired. In this case, the belt 114 is merely removed and the belt 116 shifted to extend between sheaves 112a and 110a. The illustrated arrangement provides a mechanism for obtaining one wood-cutting speed and seven metal-working speeds, however it is to be understood that various combinations of speed ratios, other than that shown, may be obtained by utilizing cone pulleys with more or less sheaves than the four illustrated.

A power actuated clutch may be used in lieu of the manual clutch previously described. In such an arrangement a pivotal yoke could engage an annular groove in clutch element 40 and a solenoid actuator could be connected to operate the yoke and move the clutch element 40 into and away from engagement with the wheel hub lugs 48. Using a power actuator, changes back and forth between metal and wood-working speeds may be made without stopping the band saw. The change speed cone pulley system 110 and 112 may be replaced by other suitable variable speed drives.

It is thus seen that applicants have provided a simplified and convenient drive mechanism which may be advantageously utilized in combination with a band saw to be used for either wood-working or metal-working, and the necessary change over from one rate of speed to another for such a band saw is accomplished through a simple mechanism that avoids the more complex structure and higher manufacturing cost of change speed gear transmissions.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination: a band saw comprising a support, a saw driving wheel, and a driven shaft fixed to said driving wheel and rotatably journalled in said support; a driving shaft parallel to said driven shaft and rotatably mounted relative to said support; a first driven wheel rotatably journalled on said driven shaft; means for selectively clutching said first driven wheel to said driven shaft; a second driven wheel and overrunning clutch coaxially mounted on said driven shaft; a first drive means directly connected between said driving shaft and said first driven wheel and arranged to rotate said first driven wheel at a high rate of rotation; a speed reducing transmission having an input means including an intermediate shaft and an output means which is drivingly connected with said second driven wheel; and a second drive means connecting said driving shaft to said intermediate shaft and arranged to rotate said second driven wheel in the same direction as said first driven wheel but at a speed less than said first driven wheel.

2. In combination: a band saw comprising a support, a saw driving wheel, and a driven shaft fixed to said driving wheel and rotatably journalled in said support; a driving shaft journalled in said support; a pulley wheel rotatably journalled on said driven shaft; means for clutching said pulley wheel to said driven shaft; a combined gear and overrunning clutch coaxially mounted on said driven shaft; a multiple sheave cone pulley drivingly connected to said driving shaft; a belt extending from one sheave of said multiple sheave cone pulley to said rotatably journalled pulley wheel; an intermediate drive means geared to said combined gear and overrunning clutch comprising an intermediate shaft, a multiple sheave driven pulley fixed to said intermediate shaft and arranged relative to said multiple sheave cone pulley whereby a plurality of speed ratios may be obtained depending upon the combination of sheaves in both of said sheave pulleys; and a drive belt extending between a second one of said sheaves of the cone pulley and an aligned sheave of said multiple sheave driven pulley adapted to be selectively shifted between other aligned sets of sheaves of the two multiple sheave pulleys.

3. In combination with a bandsaw having a support base with parallel walls and a saw driving wheel shaft passing through, journalled in and extending from both sides of the parallel walls and an opening in one of the walls below the shaft and a power shaft parallel and offset from said driving wheel shaft, saw wheel driving mechanism comprising: a driven pulley journalled on one of the extended ends of said saw driving wheel shaft; a clutch member carried by and adapted to selectively drivingly couple said saw driving wheel shaft and said driven pulley; an over-running clutch coaxially disposed on said saw driving wheel shaft between said parallel walls; a spur gear coaxially fixed on one member of said over-running clutch; a speed reduction assembly including a casing, an output gear and an input shaft journalled in the casing and having an end projecting from one side of the casing, said casing being secured in the opening in the support base wall with said output gear meshed with said spur gear and with said input shaft end projecting parallel and below said saw driving wheel shaft; a first multiple sheave cone pulley fixed on the power shaft with one sheave aligned with said driven pulley; a second multiple sheave cone pulley fixed on said end of said input shaft having its sheaves aligned with sheaves of said first multiple sheave cone pulley; and drive belt means connecting said first multiple sheave cone pulley with said driven pulley and said second multiple sheave cone pulley.

4. A multi-speed drive mechanism comprising: a support; a driven shaft journalled in said support; a driving shaft rotatably journalled on said support; a first driven wheel rotatably journalled in axially fixed relation on said driven shaft and comprising at least one pulley sheave; means for selectively clutching said first driven wheel to said driven shaft; a second driven wheel with an over-running clutch mounted on said driven shaft for drivingly connecting said shaft and said second driven wheel; a speed reducing transmission including an input shaft and an output means, said output means being in driving engagement with said second driven wheel; said input shaft being parallel to and offset from the other said shafts and having a third driven wheel, comprising a multiplicity of pulley sheaves, fixed thereto; and drive means, including said driving shaft and a driving wheel fixed thereto which includes a multiplicity of pulley sheaves, providing structurally independent drive paths between said driving wheel and each of said first and third driven wheels, said drive means being arranged to rotate said first and second driven wheels in the same direction and to rotate said first driven wheel at a higher rate of rotation than said drive means and said speed reducing transmission rotate said second driven wheel.

5. A drive mechanism as set forth in claim 4, wherein the sheave of said first driven wheel, and an end sheave of said third driven wheel, and an end sheave of said driving wheel are in radial alignment; said end sheaves of said third driven wheel and said driving wheel having a dimension whereby when connected by a belt they will provide a ratio of 1:1; a belt is drivingly engaged between said driving wheel and said third driven wheel, selectively interchangeable from one to another set of aligned sheaves on said driving wheel and third driven wheel; and a second belt is drivingly engaged between said end sheave on said driving wheel and said sheave on said first driven wheel.

6. A drive mechanism as set forth in claim 5, wherein said two multiple sheave wheels, constituting said driving wheel and said third driven wheel are interchangeable whereby said end sheave on said third driven pulley will afford the proper drive for the said belt engaging the sheave on said first driven wheel.

7. In combination: a band saw comprising a support and a saw driving wheel with a shaft non-rotatably fixed to said saw driving wheel and rotatably journalled in said support; a driving shaft parallel to said saw driving wheel shaft and rotatably mounted relative to said support; a first driven wheel rotatably journalled on said saw driving wheel shaft; means for selectively clutching said first driven wheel to said saw driving wheel shaft; a second combined driven wheel and overrunning clutch coaxially mounted on said saw driving wheel shaft; a gear transmission including an input shaft extending parallel to and offset from each of said saw driving wheel shaft and said driving shaft, and an output means which is drivingly connected with said second driven wheel; a first drive means, structurally independent of said input shaft, directly connected between said driving shaft and said first driven wheel and arranged to drive said first driven wheel at a high rate of rotation; and a second drive means connecting said driving shaft to said input shaft and arranged to rotate said second driven wheel in the same direction as said first driven wheel but at a speed less than said first driven wheel.

8. The combination band saw and multi-speed drive means as defined in claim 7, wherein said first driven wheel comprises a pulley sheave; a multi-sheave pulley is non-rotatably, removably fixed on said driving shaft with one end sheave in radial alignment with said first driven wheel pulley sheave; a second multi-sheave pulley is non-rotatably, removably fixed on said input shaft and has one end sheave equal in diameter to said one end sheave of said driving wheel, the remaining sheaves being dimensioned and positioned so a single belt can be selectively drivingly engaged between radially aligned sets of sheaves on said two multi-sheave cone pulleys; whereby said two multi-sheave cone pulleys can be interchanged to provide variation in drive ratios in said second drive means and enable an identical drive ratio in said first drive means regardless of which multi-sheave cone pulley is fixed on said driving shaft.

References Cited in the file of this patent

UNITED STATES PATENTS

| | | |
|---|---|---|
| 761,905 | Potter et al. | June 7, 1904 |
| 992,044 | Parsons | May 9, 1911 |
| 2,320,713 | Brotman | June 1, 1943 |
| 2,407,772 | Dodge | Sept. 17, 1946 |
| 2,627,288 | Steiner | Feb. 3, 1953 |
| 2,695,637 | Ocenasek | Nov. 30, 1954 |

FOREIGN PATENTS

| | | |
|---|---|---|
| 519,481 | Germany | Feb. 28, 1931 |